(No Model.)

J. H. LANCASTER.
HOISTING MACHINE.

No. 604,900.

Patented May 31, 1898.

ATTEST:

INVENTOR:
James H. Lancaster (No Model.) 7 Sheets—Sheet 2.

J. H. LANCASTER.
HOISTING MACHINE.

No. 604,900. Patented May 31, 1898.

Fig. 2.

ATTEST: INVENTOR:

(No Model.) 7 Sheets—Sheet 3.

J. H. LANCASTER.
HOISTING MACHINE.

No. 604,900. Patented May 31, 1898.

Fig. 3.

ATTEST:

INVENTOR:—
James H. Lancaster (No Model.)  
7 Sheets—Sheet 4.

J. H. LANCASTER.
HOISTING MACHINE.

No. 604,900. Patented May 31, 1898.

Fig-4.

ATTEST:  
William Cotton  
John F. Ritter.

INVENTOR:  
James H. Lancaster (No Model.) 7 Sheets—Sheet 5.

J. H. LANCASTER.
HOISTING MACHINE.

No. 604,900. Patented May 31, 1898.

Fig. 5.

ATTEST: INVENTOR:

(No Model.) 7 Sheets—Sheet 6.

J. H. LANCASTER.
HOISTING MACHINE.

No. 604,900. Patented May 31, 1898.

Witnesses
William Watton
John F. Ritter

Inventor
James H. Lancaster (No Model.) 7 Sheets—Sheet 7.

J. H. LANCASTER.
HOISTING MACHINE.

No. 604,900. Patented May 31, 1898.

Witnesses

Inventor:
James H. Lancaster
By Attorney

UNITED STATES PATENT OFFICE.

JAMES H. LANCASTER, OF NEW YORK, N. Y.

HOISTING-MACHINE.

SPECIFICATION forming part of Letters Patent No. 604,900, dated May 31, 1898.

Application filed March 11, 1895. Serial No. 541,348. (No model.)

*To all whom it may concern:*

Be it known that I, JAMES H. LANCASTER, a citizen of the United States, and a resident of the city, county, and State of New York, have invented certain new and useful Improvements in Hoisting-Machines, of which the following is a specification.

The subject of the present invention is an improved hoisting-machine particularly adapted for use in connection with a grapple, dredge, or digger, as well as a steam-shovel, operated by closing and elevating chains, said hoisting-machine having for its main objects the quick action and complete control of the drums, the convenience and safety with which the platform and supported parts can be rotated, the boom adjusted to operate and swing in any arc between the limit of its reach and its pivotal connection, and the provision of novel friction-gear of simple construction specially adapted for this class of apparatus and capable of the highest degree of service.

In the drawings accompanying this specification.

Figures 1, 14:
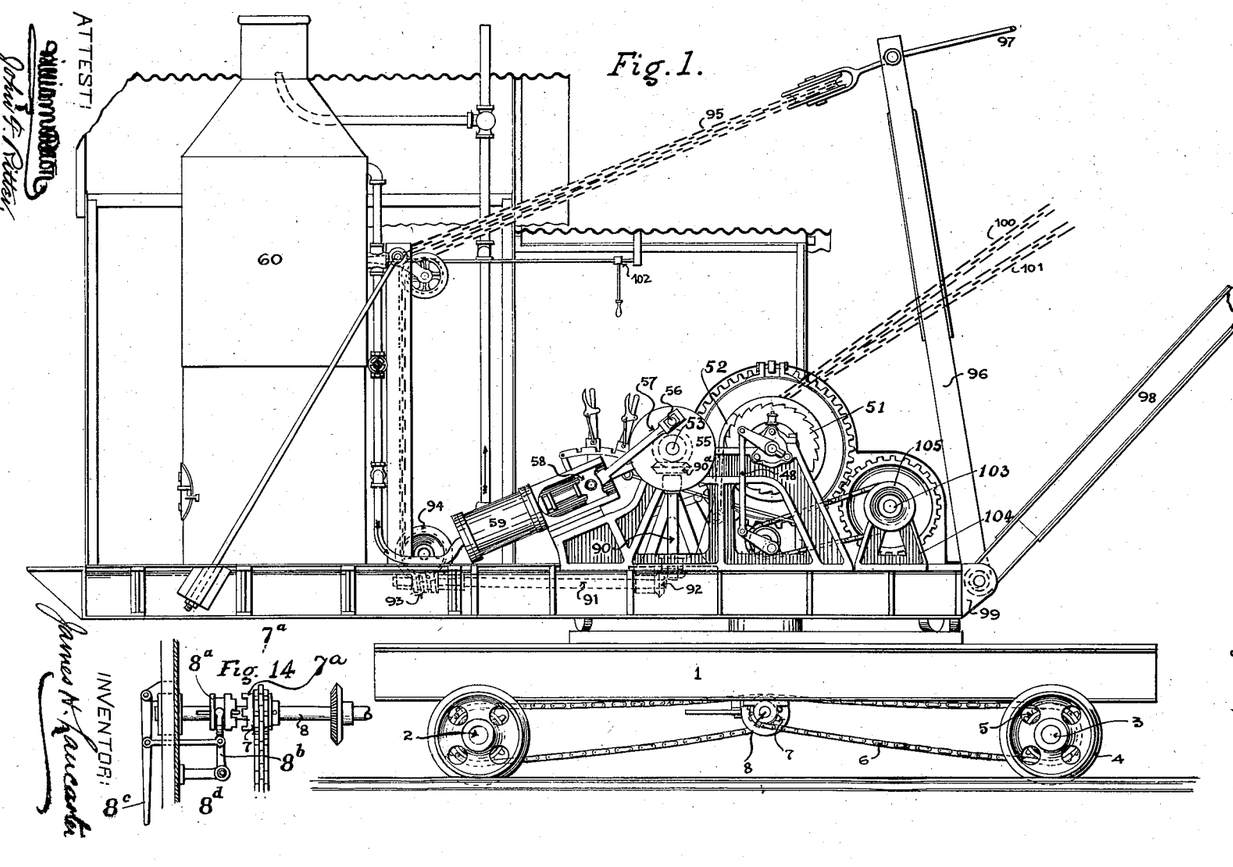
Figure 1 is a view in side elevation of a hoisting-machine embodying my improvements.
Fig. 14 is a detail view illustrating the clutch mechanism and its operating means for throwing the shaft driving the axles of the main truck into engagement with the prime driving-motor of the hoister.

A truck 1 is provided with loosely-turning shafts 2 3, with which turn the supporting-wheels 4, adapted to take suitable track-rails. Each of the shafts 2 3 carries a sprocket-wheel 5, with which engages a drive-chain 6, actuated from sprocket-wheel 7 on a horizontal shaft 8, supported centrally in suitable hangers beneath the truck. The sprocket-wheel 7 is normally loose upon the shaft 8; but in order to effect its positive engagement therewith a clutch-sleeve $8^a$, mounted on said shaft so as to have a sliding movement thereon, but revolve therewith, is adapted to be thrown into engagement with the clutch member $7^a$ of said sprocket-wheel 7. The operation of the clutch-sleeve is effected by means of a forked arm $8^b$, the yoke portion of which engages a groove in the clutch-sleeve, a hand operating-lever $8^c$, secured to the truck-frame, being connected with the arm by a link $8^d$.

A vertical shaft 9, extending upward centrally through the truck and rotating platform 10 above the latter, is intended to communicate motion to the shaft 8 by means of miter-gears 11 12.

The shaft 9 above the platform is also in driving relation with respect to a horizontal shaft 13 through the medium of miter-gears 14 15, said shaft carrying a sprocket-wheel 16, around which passes a link belt 17 in mesh with a sprocket-wheel mounted on a counter-shaft 103.

The hub 25 of a friction gear-wheel 24 is bolted to a transverse shaft 26, mounted in suitable bearings 27 in the side frames 28 upon the rotating platform.

Figure 9:
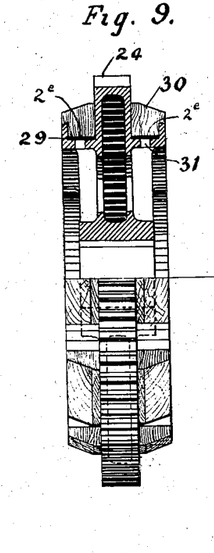
Figs. 9 and 10 are a partially-sectioned edge view and a side view, respectively, of the frictional driving-wheel.
Figure 10:
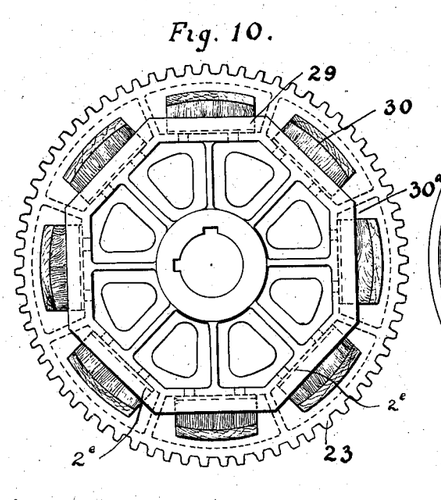

Integrally at either side of the gear-wheel 24 is a lateral extension 29, forming a series of segmental boxes, including a short wall or flange parallel with the body of the wheel, said boxes being adapted for the reception of sections or blocks 30, of wood or other fibrous material, peripherally providing a friction-surface, that portion of each extension constituting the seat for its block having an opening 31 to enable the block to be dislodged and adjustably backed by thin plates $2^e$, of suitable thickness to take up wear from frictional contact and service. The arrangement of sectional blocks in separated boxes provides intervening spaces 30ᵃ for the free circulation of air, which aids in keeping the blocks cool and prevents them from transmitting heat to each other, as would be the case were they arranged in continuous contact relation, as is usual. Moreover, all liability of charring from excessive use is thereby avoided.

Figure 11:
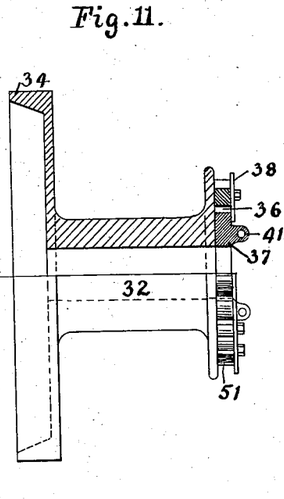
Figs. 11 and 12 are a partially-sectioned side view and inner end view of one of the movable drums.
Figure 12:
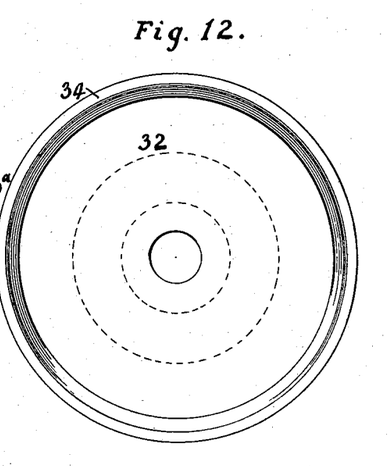
Figure 13:
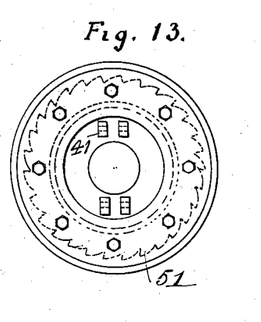
Fig. 13 is an outer end view of one of said drums.

Drums 32 and 33 are loosely mounted on the shaft 26 at either side of the central gear-wheel 24, and each drum is provided at its inner side with a horizontal flange 34, having the inner face inclined to correspond with the surface of the adjacent friction-disk, each drum being normally held out of engagement with its particular disk by means of a coiled spring 35, embracing the shaft 26 and interposed between the drum-hub and that of the wheel 24.

Figure 6:
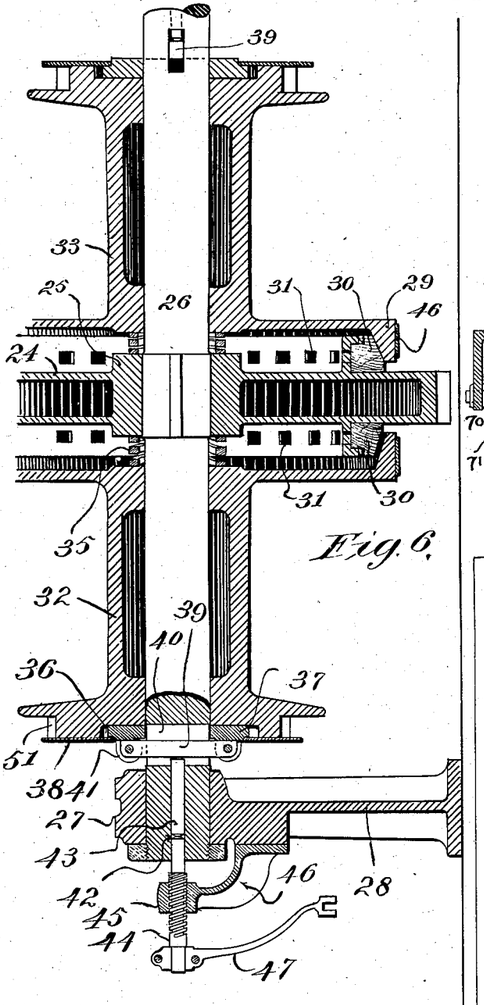
Fig. 6 is an enlarged detail view showing in section part of the means for throwing the drums into and out of engagement with the driving-frictions.

Each of the drums 32 and 33 is moved into engagement with its friction-disk by a novel arrangement of parts, which I will now proceed to describe. The outer face of each drum is provided with a circular recess 36, in which freely turns an annular plate 37, confined within said recess by means of a flat disk-ring 38, bolted on the face of the drum. The plate 37 by reason of its loose relation with regard to its drum is adapted to rotate independent of the latter, but revolve with the shaft 26, the latter motion being effected by short bar 39, which extends through an opening 40 therefor in said shaft and has its ends bolted in ears 41, projecting horizontally from said plate. A longitudinal opening 42 is formed concentrically in each end of the shaft 26, and contains a short horizontal pin 43, movable and bearing at its inner end against the bar 39. The other end of each pin 43 is in contact with the inner end of an extended threaded bolt 44, mounted in a threaded bearing 45, provided at the upper end of a bracket-arm 46, secured on the side frame. The outer end of the bolt 44 carries an arm 47, attached by vertical link 48, having suitable connection with hand-controlled appliances at the front of the machine and enabling the bolt to be given a partial rotation, so as to cause the same to travel inward in its threaded bearing, inwardly move the pin 43 in the shaft-opening, and force the plate 37 against the drum to shift the latter on the shaft 26 and bring its flange in engagement with the adjacent friction-disk. A partial rotation of the bolt in a reverse direction will so withdraw the same as to enable the coil-spring 35 to release the drum from its friction-disk.

It will be understood that each of the drums when out of engagement with its friction-disk will occupy such position that its flange will be but a short distance from the friction-surface, and hence only an exceedingly limited rotation of the bolt will be required to throw the drum into and out of gear.

The flange portion 34 of each drum carries peripherally a brake-band 49, the ends of which are so secured that a treadle-bar 50, extending to the front of the machine, can be depressed to brake the action of the drum when necessary. Each drum is also provided at its outer portion with an annular series 51 of ratchet-teeth, with which a pawl 52 is adapted to be thrown into engagement to lock the drum against reverse rotation when the same is released from the driving action of the friction-disk.

The prime power-shaft 53 of the machine is arranged parallel with the shaft 26, and is also supported in bearings 54 in the side frames, the projecting ends of the shafts carrying disk-wheels 55, each provided with a disk-pin 56, seated in the end of a pitman 57, pivotally connected with a block 58, sliding in guides and actuated by the piston-rod attached to a piston within the cylinder 59. Steam is supplied to the cylinders 59 through suitable pipe connections with the upright boiler 60. Motion is transmitted from the shaft 53 to the central gear-wheel 24 by means of a gear-pinion 61, secured centrally on the power-shaft. Also on said power-shaft are pairs of beveled gears 62 and 63, each pair of which is located to one side of the central pinion 61. These bevel-gears 62 and 63 loosely turn on the power-shaft and are provided on their inner faces with cam-shoulders 64, adapted to be engaged by the opposite cam-face of a clutch-sleeve 65, interposed between each pair of bevel-wheels and sliding on but rotating with the shaft 53. Arm 66 is provided for each clutch-sleeve and is mounted on a vertical pivot, so that the roller engagement 67 with the annular groove in said clutch-sleeve will not interfere with the rotation of the latter but yet admit of said arm being thrown to shift the sleeve on its shaft.

The gears 63 are in mesh at their lower sides with a horizontal bevel-gear 67ˣ, secured on the upper end of a vertical shaft 68, supported in a suitable top bearing and also in a seat 69, provided therefor in the top of the platform 10. This latter carries a series of rollers or wheels 70, designed to travel in a circular path on a track or way 71 on the upper side of the truck, the latter also having adjacent to said way an inner circular rack-gear 72, shown in Fig. 3 as being beveled and in Fig. 7 as vertical. A pair of hangers 73 depend from the under side of the platform and are arranged to support in radial relation the horizontal shaft 74, the inner portion of which carries a worm-wheel 75 in gear with a worm 76 on the lower end of the shaft 68 and a cone-wheel 77. Adjacent to the outer hanger 73 a bevel gear-wheel 78 is loosely mounted upon the shaft 74 and engages the teeth of the circular bevel-rack 72. This gear-wheel 78 is connected with a cone-shell 79, also loosely mounted and relatively attached to the wheels 78 through the medium of a coiled spring 80, the stiffness of which can be regulated through the medium of clamp-nuts 81, so as to hold the cone-shell 79 in engagement with the cone-wheel 77 with a greater or less pressure. For the sake of strength and simplicity the shaft 74 may also carry one of the traveling wheels 70. When the spring 80 is so adjusted as to hold the shell 79 in friction engagement with the cone, the gear-wheel 78 will be positively driven to cause the rotation of the platform. The relation of these several parts is such that whenever the resistance to the free movement of the gearing becomes so great that the stability of the gearing is endangered the spring 80 will yield to an extent that will enable the shell to slip on the cone, and thus interrupt the gear transmission. In this class of machinery such an automatic slip-gearing is most important, as experience has demonstrated that much difficulty is encountered when some such arrangement is not provided. It will be understood that the platform will be swung in one direction or the other, according to which bevel-gear 63 is engaged by the clutch-sleeve 65, the direction of rotation of the shafts 68 and 74 being of course dependent upon this operation.

Figure 3:
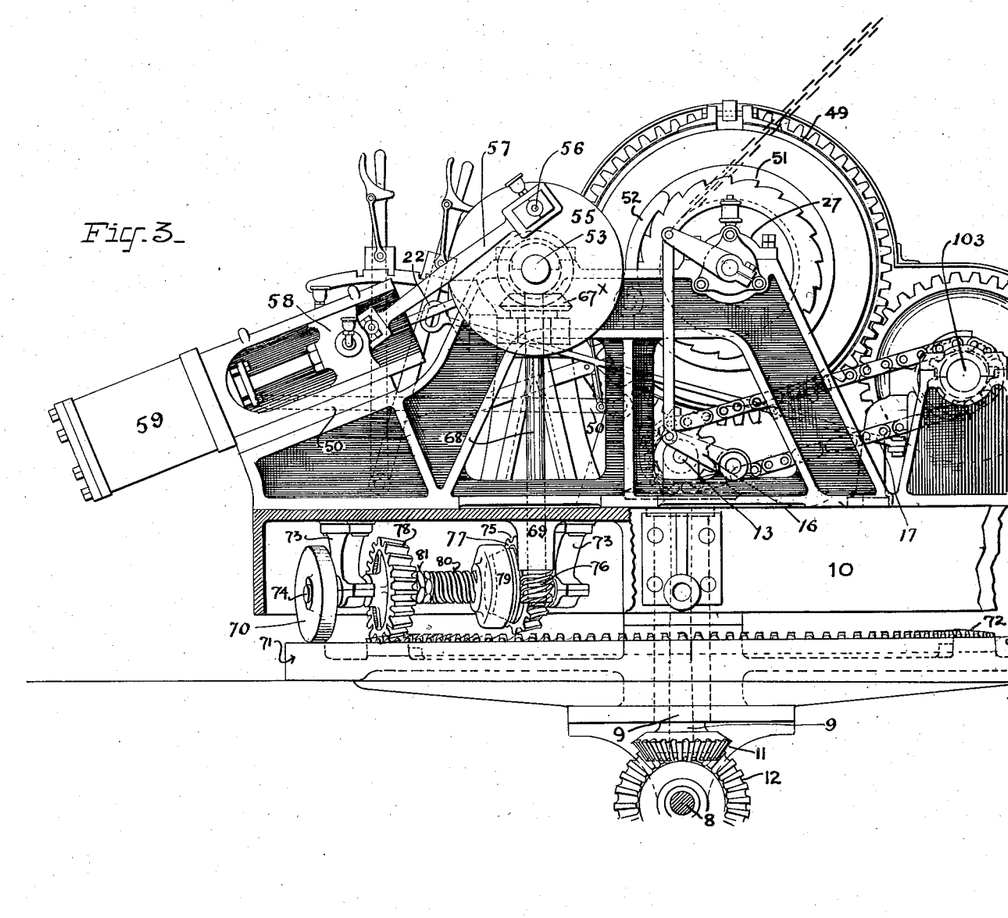
Fig. 3 is an enlarged detail side view, partly in section, showing one form of slip-gearing for rotating the platform.
Figure 4:
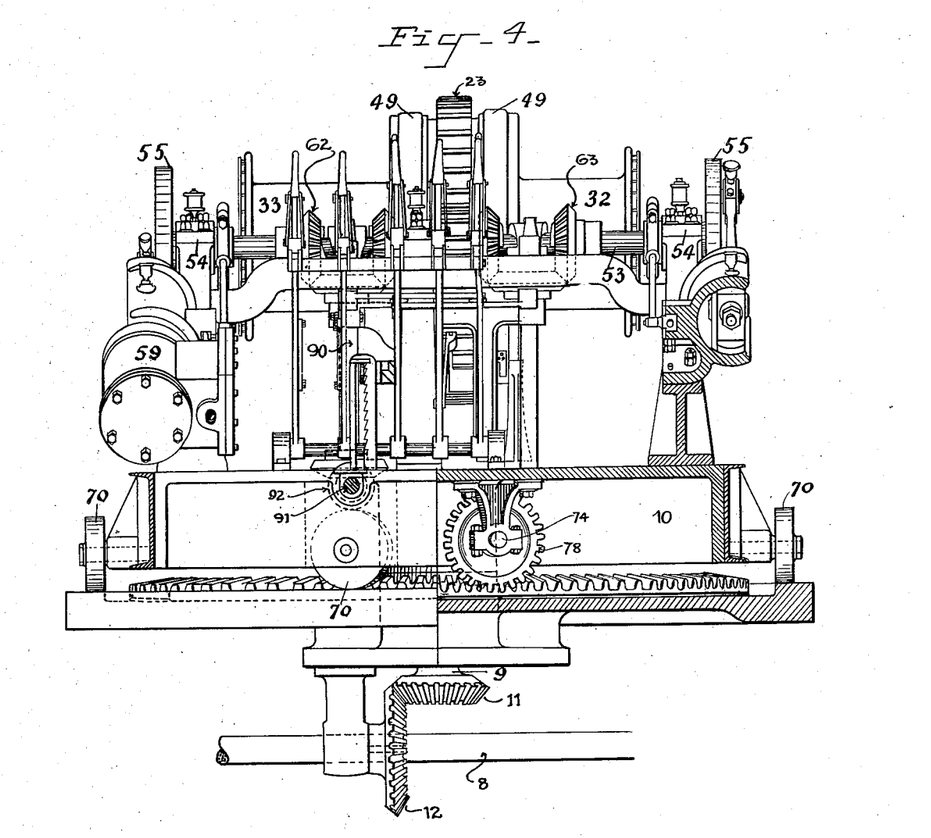
Fig. 4 is an enlarged detail view, partly in section, looking from a point in the rear of the engine-cylinders.
Figure 5:
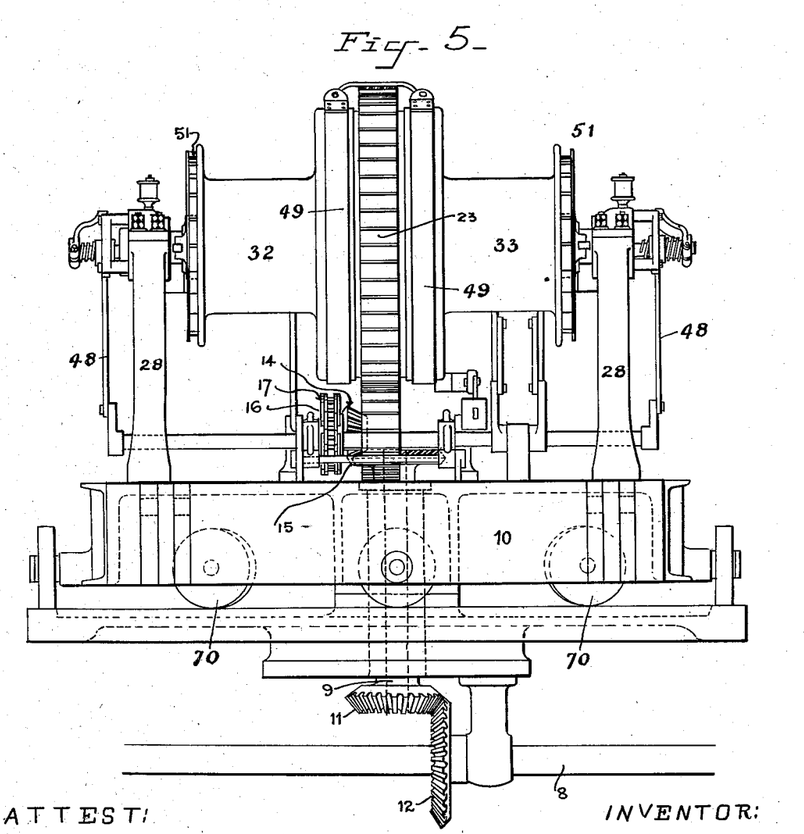
Fig. 5 is an enlarged detail view looking from the opposite end of the machine.
Figure 7:
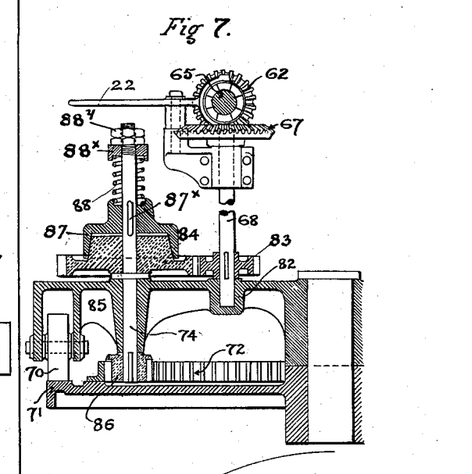
Figs. 7 and 8 are a detail section and plan view, respectively, of a modified form of gearing embodying the provision of a yielding part to relieve the platform-rotating gearing whenever strain becomes excessive.
Figure 8:
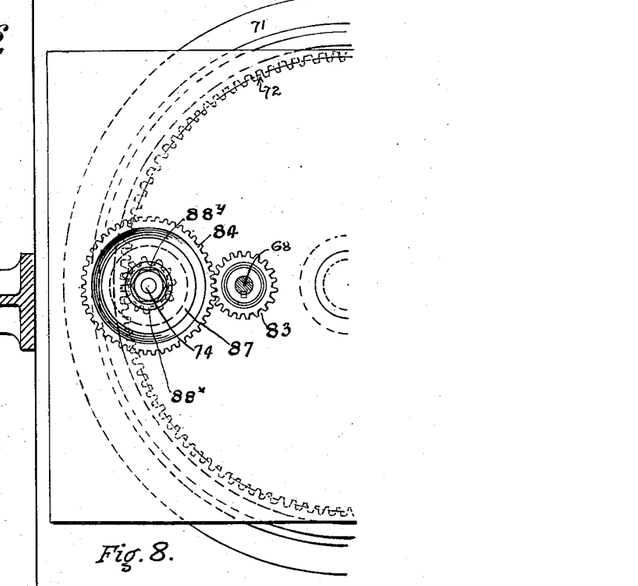

The automatic safety-gearing immediately above described may be modified to a considerable extent and still be within the scope of my invention. In Figs. 7 and 8 I have shown another arrangement which in some instances may be preferred. The vertical shaft 68 instead of passing through the revolving platform is stepped in a bearing 82 in the latter and carries a gear-pinion 83, in mesh with a gear-wheel 84, mounted loosely on the vertical shaft 74, supported in a suitable bearing 85, formed with the platform. The smaller pinion 86 on the lower end of the shaft 74 meshes with the teeth of the circular gear-rack 72, the teeth of which in this case are vertical instead of bevel, as shown in Fig. 3. Connection is established between the gear-wheel 84 and shaft 74 by means of a friction-lock consisting of a shell 87, adapted to engage a correspondingly-shaped hub of the wheel 84, said shell being adapted to slide upward upon the shaft, but rotate therewith by means of a spline or feather engagement 87$^x$. The shell 87 is held down in frictional engagement with the said hub by means of a spring 88, the stiffness of which is adjustably controlled by means of a follower 88$^x$ and suitable clamp-nuts 88$^y$. In this arrangement, as in the other, undue resistance or strain on any part of the gear transmitting power to the wheel engaging the circular rack will cause the spring to yield and interrupt the frictional engagement of the shell with the hub.

The bevel-gears 62 and their clutch-sleeve control the motion of a vertical shaft 90, at the upper end of which a meshing bevel gear-wheel 90$^a$ is secured, while the lower part of the same communicates motion to the horizontal shaft 91 through the medium of a pair of miter-gears 92. The shaft 91 is sustained in suitable bearings carried by the revolving platform and is provided at its outer end with a worm 93, driving a worm-wheel secured on a horizontal shaft carrying a drum 94, controlling hoisting or lowering chains 95, connected with the upper end of a rocking frame 96, attached by tie-rods 97 to a vertically-movable pivoted boom 98, from the extremity of which the grapple works. It will be noted that the lower ends of the beams comprising the Λ-shaped frame and the tongues at the inner ends of the beams comprising the boom are pivotally secured in position to the end of the platform by bolts seated in suitable ears 99. By this arrangement a single connection serves for both sets of beams, as shown most clearly in Fig. 2, without one set interfering in any way with another, since one of the ears of each pair is located between the adjacent ends of the beams attached thereto.

The operation and purpose of the construction thus far described will be readily understood. One of the important features connected with the invention is the arrangement of boom, intermediate frame, and controlling means, by which the boom can be adjusted at any position, so as to work or sweep at any point intermediate of the platform and the outer limit of the boom.

In the general operation of the machine one of the drums—say 32—is first thrown into action to wind up one of the chains 100 and 101, which both pass over a guide-pulley (not shown) at the extremity of the boom, the chain 100 connecting with the blade-sections of the grapple or digger to close the same when said chain is wound upon the drum. As soon as the drum 32 has revolved sufficient to cause its chain to close the blade-sections the drum 33 is thrown into gear, so as to revolve coincident with its companion, and traction will then be exerted on both chains to cause the grapple to be elevated.

Notwithstanding the continued rotation of the central gear-wheel 24 the drums can be stopped by simply throwing the pawls 52 into engagement with the ratchets 51 and disengaging the drums from the friction-disks. The gearing controlling the turn-table devices can then be operated to occasion the platform to rotate so as to laterally swing the boom to the desired extent, after which the drum 32 can be released and permitted to run under the tension of its weighted chain to allow the grapple-sections to open and release the charge or load. By reversing the turn-table gearing the platform can be moved back to restore the boom to its first position for another dip of the grapple, at which time the brakes of both drums are released to permit their free revolution and enable the descent of the grapple in an open position.

In case it becomes necessary to discharge at a point outside of or beyond the limit of the sweep of the boom the propelling mechanism can be thrown into operation and the entire machine moved or caused to travel on its track-rails to any extent desired.

The steam connections with the cylinders of the driving-pistons are conveniently under the control of the attendant. The movement of said pistons can be stopped or started through the agency of a lever-and-rod connection 102, arranged immediately over the point occupied by the attendant.

The shaft 103, which communicates motion to the propelling devices, is supported in suitable bearings 104 and carries winch-heads 105, generally useful in this class of machine. As it is obviously undesirable that this shaft 103 should continuously rotate, I provide means for throwing it into and out of operation and controlled from the point occupied by the operator. These means comprise a gear-wheel 106, loosely mounted on the shaft 103 and driven from the wheel 24, said gear-wheel being provided on one of its sides with a clutch-face $106^x$, adapted to be engaged by a clutch-sleeve 107, sliding on but rotating with said shaft, and adapted to be shifted by a bell-crank lever 108, operated by a hand-rod $104^x$ extending to the other end of the platform.

Figure 2:
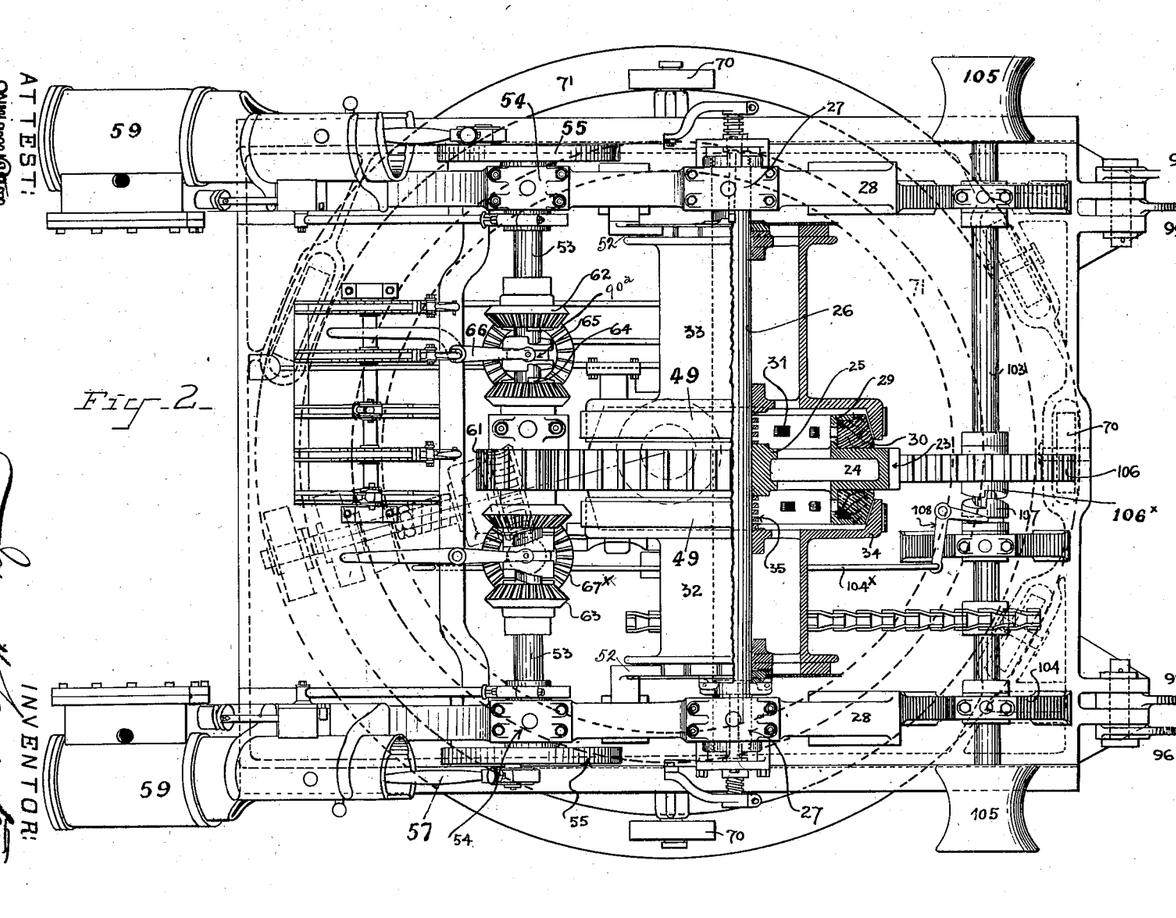
Fig. 2 is an enlarged plan view of the parts constituting the hoisting-machine proper and showing certain portions thereof in horizontal section.

As will be clearly seen in Fig. 2, the outer portions of the sections 30, constituting the friction-surface at each side of the gear-wheel 24, are of greater width than the boxes in which they bear, so that they present the extended bearing-surface required without exposing any of the metal to frictional wear.

I claim—

1. The combination in a hoisting-machine, of a turn-table platform, a vertically-movable pivoted boom, a rocking frame, a driving-shaft, a truck, a clutch-gearing mechanism on the driving-shaft for rotating the platform in either direction, a friction-driver, a counter-shaft, drums on opposite sides of said driver, a spring for normally holding the same in a disengaged position, extensions extending adjacent to the driving-shaft and adapted to independently throw said drums to engage with the friction-driver, a vertical boom-adjusting mechanism, platform-actuating means and boom-drum-operating devices adapted to be controlled from a point contiguous to that from which the main-drum-operating connections are manipulated, all arranged and combined substantially as and for the purposes specified.

2. The combination in a hoisting-machine, of a turn-table platform carrying a boom and frame at an angle thereto, both being fulcrumed at their lower ends on the same pivots at the front of the platform and connected at their top, a drum operating a cable for adjusting the vertical frame and boom, a drive-shaft on said platform rotating a friction-driver on a counter-shaft upon which loosely turn drums at opposite sides of the driver, connections for throwing either or both of the drums last mentioned into engagement with the driver, means for rotating the platform and clutch-gearing for actuating the same, substantially as set forth.

3. The combination in a hoisting-machine, of a turn-table platform carrying a boom and supporting a drive-shaft imparting motion to a friction-driver rotating a counter-shaft; the driver comprising in metal, a central hub provided with an annular series of gear-teeth and an extension at each side thereof, yielding material in said extensions, drums on opposite sides of said driver and normally held by springs in a disengaged position, connections extending adjacent to the drive-shaft and adapted for independently throwing said drums into engagement with the friction-driver, means including clutch-gearing on the drive-shaft for rotating the platform in either direction and for independently driving a third drum controlling the vertical adjustment of the boom, said platform-actuating means and boom-drum-operating devices being adapted to be controlled from a point contiguous to that at which the main-drum-operating connections are manipulated, substantially as set forth.

4. The combination in a hoisting-machine, of the boom-carrying platform supporting a drive-shaft and its controlling means, the former having a toothed pinion meshing with a driver centrally mounted on and rotating a counter-shaft; the driver comprising in metal, a central hub provided with an annular series of gear-teeth and an extension at each side thereof, yielding material in said extensions, together with drums at opposite sides of said driver, connections extending adjacent to the drive-shaft and adapted to independently throw said drums into engagement with the friction-driver, means including clutch-gearing on the drive-shaft for rotating the platform, said platform-actuating means being also controllable from a point adjacent to that at which the drum-actuating means are manipulated; said drive-shaft also actuating clutch-gearing for driving the truck-carrying wheels, substantially as set forth.

5. The combination in a hoisting-machine, of the boom-carrying platform supporting a drive-shaft and its controlling means, the former having a toothed pinion meshing with a driver centrally mounted on and rotating a counter-shaft; the driver comprising in metal a central hub provided with an annular series of gear-teeth and an extension at each side thereof, yielding material in said extensions, together with drums at opposite sides of said driver, connections extending adjacent to the drive-shaft-controlling means for independently operating the drums, a wheel 106, meshing with the driver and loosely mounted on a winch-head shaft 103, to operate the same as specified, and clutch mechanism and its operating means for actuating the shaft 103, substantially as set forth.

6. In a hoisting-machine, the combination with a wheel having contiguous to its periphery, a series of laterally-extending boxes, each including a wall parallel with, and connected to the wheel by a perforated bottom and end walls, the opposing walls of any pair of boxes being separated to afford intervening air-spaces, of a series of radial segments of yielding material within and bearing against the bottoms of said boxes and exposed near the wheel periphery, substantially as set forth.

7. In a hoisting-machine, the combination with a wheel having contiguous to its periphery, a series of laterally-extending boxes, each including a wall parallel with, and connected to the wheel by a perforated bottom portion, of a series of radial segments each of yielding material, within and having an outer portion overlapping the outer wall of its box, and an independent plate or section, interposed between each segment and its box-bottom to take up wear, substantially as set forth.

In testimony that I claim the foregoing as my invention I have signed my name, in presence of two witnesses, this 8th day of February, 1895.

JAMES H. LANCASTER.

Witnesses:
JOHN F. RITTER,
WILLIAM PAXTON.